United States Patent [19]

McCabe

[11] 3,898,846
[45] Aug. 12, 1975

[54] OFFSHORE STORAGE TANK
[75] Inventor: John Stanton McCabe, Naperville, Ill.
[73] Assignee: Chicago Bridge & Iron Company, Oak Brook, Ill.
[22] Filed: Feb. 19, 1974
[21] Appl. No.: 443,341

[52] U.S. Cl. ............... 61/46; 114/74 A; 220/9 LG; 220/13
[51] Int. Cl.² ...................... E02B 29/06; F17C 1/00
[58] Field of Search .................. 61/.5, 46, 46.5, 1 R; 220/13, 9 LG; 114/74 R, 74 A

[56] References Cited
UNITED STATES PATENTS

| | | | |
|---|---|---|---|
| 2,933,902 | 4/1960 | Howard | 114/74 A |
| 3,085,533 | 4/1963 | Goryl et al. | 114/74 T |
| 3,488,969 | 1/1970 | Lacy, Jr. | 61/46.5 |
| 3,727,418 | 4/1973 | Glazier | 61/.5 |
| 3,828,565 | 8/1974 | McCabe | 61/46.5 |

*Primary Examiner*—Paul R. Gilliam
*Assistant Examiner*—Alex Grosz
*Attorney, Agent, or Firm*—Merriam, Marshall, Shapiro & Klose

[57] ABSTRACT

A multi-section tank for offshore liquid storage having an insulated upper receptacle for storage of a liquid at a temperature above or below atmospheric temperature and a lower receptacle filled with fluid, advisably a liquid such as water, oil or the like or a combination of a liquid and a gas. The fluid provided within the lower receptacle functions as a support for the bottom of the upper receptacle thereby eliminating the need for structural supports for the bottom of the upper receptacle when it contains a liquid load. The fluid in the lower receptacle also exerts an internal pressure which counteracts the external compressive sea forces. The lower receptacle is generally kept full enough with a liquid so that the weight of the liquid plus the tank weight enables the tank to withstand horizontal and overturning forces of the sea when the tank rests on a sea floor and the upper receptacle is empty. The upper receptacle is particularly suitable for storing a liquefied gas.

13 Claims, 2 Drawing Figures

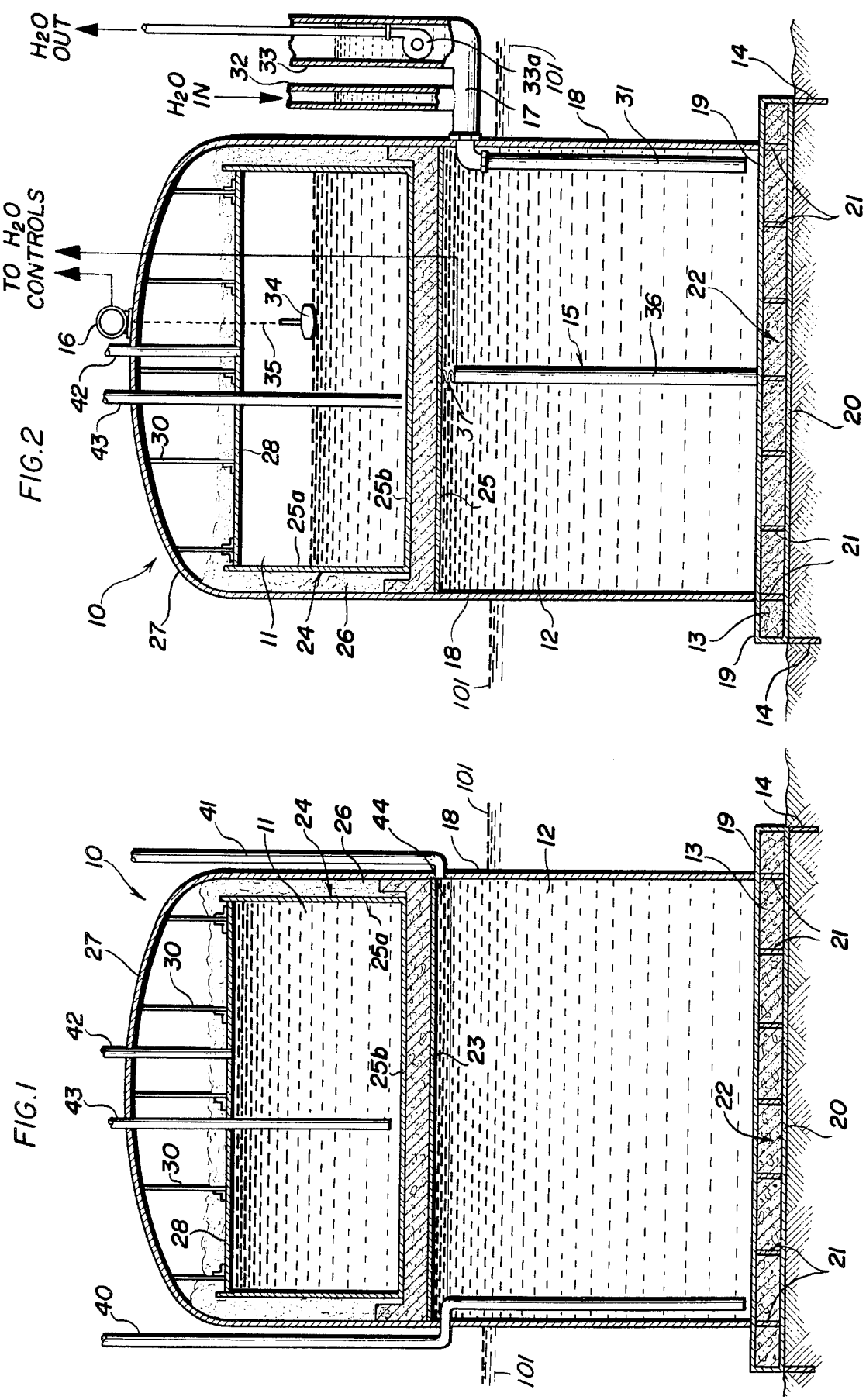

OFFSHORE STORAGE TANK

BACKGROUND OF THE INVENTION

This invention relates to offshore storage tanks. More particularly, it pertains to an offshore tank used to store a liquefied gas.

Offshore storage of liquids which are maintained significantly below or above atmospheric or ambient temperature pose special problems, inasmuch as the stored liquids must be insulated from the atmosphere and/or sea water, and also or alternatively from the structure supporting the storage vessel. Provision must be made for adequately supporting the stored liquid during a cycle of loading and unloading. At present, suitable facilities for offshore insulated storage are limited to floating vessels or ships, which may be moored or anchored at suitable locations. Relatively sophisticated and expensive structures are required to satisfy the structural and safety requirements for the temperatures and loads involved. Provision must be made for mooring or anchoring the floating storage vessel in various offshore locations and while exposed to various weather and water conditions.

With rapidly growing world energy requirements, it will become increasingly necessary to recover gases currently wasted offshore, and to liquefy the gases and store them in offshore facilities. It will thus be highly advantageous to have available suitable offshore facilities for the insulated, refrigerated storage of liquefied hydrocarbons such as natural gas or methane, propane, butane and other low temperature liquefied gases such as oxygen, hydrogen, and ethylene, which preferably are stored at about their boiling points at approximately atmospheric pressure. Other materials may be stored in the liquid state, at temperatures ranging from above to below ambient temperatures. The storage facilities may be employed for holding materials near the locations at which they are recovered, or for storing materials delivered from remote points, pending delivery elsewhere or for use at adjacent locations.

SUMMARY

This invention relates to storage tanks adapted to receive and store cryogenic liquefied gases and cryogenic liquids. The invention is contemplated for use with offshore storage facilities with the storage tank partially submerged within the surrounding water and resting on the sea floor. The invention contemplates using a large substantially vertical shell, desirably circular or cylindrical, divided into an upper receptable and a lower receptacle. The upper receptacle of the tank can be adapted to receive and store a cryogenic liquefied gas and, therefore, can include an inner tank insulated from the vertical shell to thereby reduce heat flow into the stored liquefied gas. The lower receptacle can be filled with liquid or a combination of liquid and gas under pressure. Except for quite small tanks with heavy ballasting, it is not considered economically practical to fill most or all of the lower receptacle with a gas. The lower receptacle is generally kept full enough with a liquid so that the weight of the liquid plus the tank weight enable the tank to withstand horizontal and overturning forces of the sea when the tank rests on a sea floor and the upper receptacle is empty.

The lower receptacle, which is filled with a fluid, has a single wall construction and is divided from the upper receptacle by a partition, or bottom wall, which is connected around its periphery to the outer cylindrical shell. The fluid in the lower receptacle provides all the necessary support for the partition thereby making it unnecessary to use any structural members to support the partition and especially the central portion of the partition. By supporting this bottom or partition on fluid, particularly a non-compressible liquid, stored in the lower receptacle, the requirement of extensive structural supports extending to the sea bottom is eliminated. This invention supports the upper receptacle bottom through the use of fluid pressure applied against the lower surface of the bottom and transfers hydraulic pressures into the side wall of the lower receptacle portion where they are absorbed as circumferential or hoop stresses. By transferring theses deflection forces through the supporting fluid and into circumferential stresses, the lower supporting shell may be made thinner than usual because compressive sea forces on the lower receptacle wall are countered, thus increasing the buckling resistance of the shell and increasing the vertical load carrying ability of the shell wall lower portion. Fluid in the lower receptacle may consist primarily of liquid such as water and also may include a second liquid such as oil or a layer of pressurized gas between the top surface of the liquid and the partition or bottom of the upper receptacle.

Additionally, one form of the invention contemplates utilizing a standpipe filling and drainage arrangement for the lower receptacle in combination with sensing elements to detect the amount of deflection of the partition caused by the weight of stored liquefied gas thereabove. Pumping equipment used in conjunction with the standpipe and partition deflection monitoring equipment is used to control the amount of liquid and pressure exerted thereby in the lower receptacle and against the lower surface of the partition or bottom. Deflection of the partition can be monitored by use of a deflection gauge directly in contact therewith or by means of a float assembly which will monitor the level of liquid in the upper receptacle and then translate the liquid level into an associated deflection figure for the partition.

An object is to provide a storage facility of the foregoing character, that is versatile and adaptable to the storage of a number of materials at diverse temperatures, including gaseous materials stored in the liquid state at a suitable liquefaction temperature, and, preferably, at about atmospheric pressure.

An important specific object of the invention is to provide such a facility for storing normally gaseous materials that are liquid or have boiling points at low temperatures on the order of −20°F. and below. An accompanying object is to provide facilities for storing such liquids at substantially atmospheric pressure and at about their boiling points, with their liquefaction temperatures maintained by suitable refrigeration, preferably, by removing any heat input as heat of vaporization of the stored material.

Another specific object is to provide an offshore liquid storage facility which utilizes a liquid storage receptacle that may be filled and emptied alternately, and while the weight characteristics vary with the stored load, the receptacle is supported on a column of liquid.

Because the specific gravity of liquids to be stored in the upper receptacle are less than the specific gravity of water, the height of the water column in the standpipe could be lower than the height of liquid in the upper receptacle. In addition to using a static column of water or other suitable liquid in a standpipe arrangement, a positive pressure device such as a pump could be used to pressurize the fluid in the lower receptacle in order to support the bottom of the upper receptacle. Should a layer of gas be used as the supporting fluid in the lower receptacle, a compressor and holding tank or receiver could be used to maintain upper receptacle bottom supporting pressure within the lower receptacle.

Additional objects include the provision of an offshore liquid storage facility having a relatively simple, basic design, which minimizes the structural material requirements, both quantitatively and qualitatively, to thereby provide economies in manufacture, assembly, transportation, installation and use.

It is also an object of the present invention to provide a storage facility for receiving and storing liquefied gases and having an insulated storage receptacle mounted atop a support column portion comprising a cylindrical outer shell filled with a liquid in direct contact with the horizontally extending bottom partition of the upper storage receptacle section.

Another object of the present invention is to provide a liquefied gas storage tank having an upper insulated receptacle and a lower fluid support receptacle and having monitoring means for sensing the deflection of the bottom of the liquefied gas storage upper receptacle and combining the monitoring equipment with a standpipe and pump unit for filling or draining fluids from the lower support column portion of the storage tank unit in response to signals from the monitoring equipment.

These and other objects of the invention will become apparent from reference to the following description, appended claims and attached drawings.

DESCRIPTION OF THE DRAWINGS

FIG. 1 is a vertical cross-sectional view of the tank of the present invention showing the operative structural features of the tank; and, FIG. 2 is a vertical cross-sectional view similar to that illustrated in FIG. 1 with the addition of sensing devices for monitoring the deflection of the bottom partition wall of the top receptacle and also disclosing the standpipe and pump unit contemplated for use therewith.

Referring now to the drawings and in particular to FIG. 1, there is disclosed an offshore tank designated generally by the numeral 10 which is adapted to be positioned on the floor of the ocean and thereafter to receive and store liquefied gases. The tank 10 is divided into an upper receptacle 11 and a lower receptacle 12. The lower receptacle 12 is positioned on top of and joined to a footing 13. Footing 13 may have depending portions 14 for securely positioning the structure to the ocean floor.

As illustrated in FIG. 2, the tank 10 may include a deflection gauge 15 or a float assembly 16 for monitoring the amount of deflection of the bottom of the upper receptacle 11. A standpipe assembly is designated by the numeral 17 and is used in conjunction with the deflection gauge 15 or float assembly 16 to add or remove fluid from the lower receptacle 12. These general elements are parts of the storage tank 10 of the invention and will hereinafter be more fully described with particular emphasis on the inter-relation between the component parts.

The offshore tank 10 includes a cylindrical outer wall 18 which is attached to and extends upwardly from the associated bottom plate 19. Vertically and downwardly spaced at the bottom plate 19 is an associated tank support plate 20. Spacing the plates 19 and 20 are a plurality of spacer members 21 which may be concentric circular banks disposed between the two plates and rigidly connected thereto thereby forming a firm foundation for the tank 10. The open spaces between the spacers 21 may be filled with a ballast material such as dense concrete 22 to rigidify and stabilize the entire tank unit. As mentioned earlier, portions 14 may depend from the foundation unit to securely position the tank on the ocean floor.

The upper receptacle 11 is separated from the lower receptacle 12 by a partition or bottom member 23 which is in contact with the liquid in the lower receptacle 12. Positioned within the space which is formed by the bottom or partition 23 and the cylindrical outer wall section 18 is an inner container 24 having both a side wall 25a, which is concentric with the outer tank wall 18, and a bottom wall 25b which is vertically spaced from and is parallel to the horizontally extending partition or bottom 23. Insulation 26 is installed within the space which is provided between the outer tank wall 18 and the inner container 24 to retard the transfer of heat from outside the tank to the liquefied gas stored within the inner container 24. In the space between the bottom 25b of the inner container 24 and the partition 23, a load bearing insulating substance may be used to transfer loads between the inner container bottom 25b and the partition 23.

The top portion of the tank 10 is enclosed by roof 27 which may have depending side edges which are adapted to align with, and join to, the cylindrical outer wall 18 or inner wall 25a. Additionally, design of the tank roof 27 will allow for the suspension of an insulation deck 28. This deck 28 is contemplated as being a large circular or disc-shaped member adapted to fit above the open top portion of the inner container 24. Hangers 30 are attached to the tank roof 27 and extend downwardly to the deck 28 to provide vertical support for the deck.

As shown in FIG. 1, liquid or gas can be supplied to the lower receptacle 12 by conduit 40 or by conduit 41. Thus, if desired water can be supplied by conduit 40 and air removed by conduit 41 from the lower receptacle to decrease the buoyancy of the tank and thereby cause it to descend to and rest on the sea floor. A layer of pressurized air 44 can be maintained between the water in the lower receptacle and partition 23. The partition 23 is advisably positioned to be high enough above the surface 101 of the sea so that the weight of the liquid in the lower receptacle 12, plus the weight of the tank including ballast 22, is enough to withstand the horizontal and overturning forces of the sea at all times, even when the upper receptacle 11 is empty.

Conduit 43 can be used to fill and empty the upper receptacle 11 and conduit 42 can be used to remove vapor therefrom during filling and to vent off vapor formed during storage of a liquefied gas therein.

In the event is would be desirable to provide a pressure regulation capability as well as a filling and fluid removal capability in the lower portion of the tank 10, it is also contemplated that sensing devices can be embodied to detect the level of fluid within the upper inner container 24 through directly sensing the fluid level of liquefied gas or providing a sensor in communication with the bottom or partition 23 to monitor its deflection. The purpose of providing the control members 15 or 16 is to control the vertical deflection of the partition 23 and thereby couple it with the standpipe and pump assembly 17 to either increase or decrease the pressure of the supporting fluid in the lower receptacle. Additionally, the positive fluid pressure produces a tensile load within the cylindrical outer wall 18, thus creating a stiffened column member having maximum resistance to both compressive circumferential loads created by external pressures and compressive buckling loads created by vertical loading. The illustration of FIG. 2 indicates that utilization of water as the pressure equalizing liquid is preferred; however, as mentioned earlier it may be desirable to use other liquids, and liquid plus gas, provided of course, that suitable storage and disposal facilities are maintained.

With reference now to FIG. 2, it is noticed that the standpipe and pump assembly 17 includes a tank feed pipe 31 comprising a pipe portion extending generally to the bottom area of the lower receptacle 12 thereby providing a single pipe which may be utilized for both filling of the lower receptacle 12 and emptying purposes. Located externally of the tank 10 and included in the standpipe and pump assembly 17 is an inlet pipe 32 through which a liquid may flow during filling of the lower receptacle 12. Associated with the inlet 32 is a discharge duct 33 which includes an associated pump unit 33a for removing liquid from the lower receptacle.

It is thus noticed that a positive uplifting liquid pressure may be maintained against the horizontally disposed bottom or partition 23 thereby counterbalancing any vertical downward loading which shall be imposed by the weight of liquefied gas within the inner container 24. The inlet duct 32, in combination with the discharge duct 33, form a standpipe which not only may be utilized to maintain a positive pressure to uplift the upper receptacle bottom partition 23, but also which will provide an accompanying positive liquid pressure within the inside portion of the lower receptacle 12 thereby placing the cylindrical outer wall 18 in tension and thereby increasing the cylindrical tank's resistance to buckling.

To determine the amount of positive pressure required to provide a compensating vertical upward force to support the partition 23, monitoring equipment such as 15 or 16, may be fitted into the tank to either directly sense the deflection of the partition 23 as by use of the deflection gauge 15 or to indirectly monitor the deflection of the partition 23 by sensing the amount of fluid within the upper receptacle 11 and thereby calculating through additional monitoring equipment the associated amount of deflection of the partition 23.

To determine the amount of liquefied gas within the upper storage receptacle 11, a mechanical float member 34 may be positioned within the tank and connected to a chain or lever arrangement 35 in communication with converting gauges which will indicate the amount of liquid in the receptacle and the corresponding deflection of the partition 23 and according to a predetermined actuating point, either add liquid to, or remove it from, the lower receptacle 12.

Alternatively, direct monitoring of the partition 23 may be accomplished by positioning a deflection gauge assembly 15 near the center of the partition 23 and providing a support which extends from the bottom plate 19 and is used as a constant reference point. Mounted atop the gauge support 36 is a sensing element 37 which may be of any convenient form required to sense the amount of deflection such as mechanical levers or electrical transducers which are suitable for measuring deflections within the required range.

When a predetermined level of liquefied gas has been filled into the upper receptacle 11 the float and associated monitoring equipment will actuate suitable equipment to add additional liquid to inlet 32 and, consequently, to the lower receptacle 12 thereby providing a supporting liquid force which prevents excessive deflection of the partition 23. If direct monitoring equipment, such as the deflection gauge 15, is used a predetermined amount of deflection of the partition 23 will actuate pumping equipment to add supporting liquid through the discharge duct 32 and, consequently, into the lower receptacle 12 to provide a pressure within the receptacle which will prevent excessive deflection of the bottom or partition 23.

Thus, it is noticed that with the tank storage facility provided, a new and reliable storage facility has been created which will simplify and economize the offshore storage of liquefied gases. by utilizing fluid pressure within the lower receptacle 12, the external forces of the surrounding ocean are resisted thus increasing the vertical load carrying strength of the lower tank 12. By utilizing a noncompressible liquid, or a combination of a liquid and a layer of compressed gas above the liquid, or two or more liquids such as a layer of water and a layer of oil, in the lower receptacle 12 as a support system, a large volume of liquid, such as liquefied gas, can be stored in the upper receptacle 11. If a gas is placed in the lower receptacle, care should be taken to avoid unduly reducing the lack of buoyancy of the tank since this could lower the stability of the tank by reducing its pressure on the sea floor.

The foregoing description and drawings merely explain and illustrate the invention and the invention is not limited thereto, except insofar as the appended claims are no limited, as those skilled in the art who have the disclosure before them will be able to mae modifications and variations therein without departing from the scope of the invention.

What is claimed is:

1. An offshore tank for storage of a liquid comprising:

a vertical shell, a bottom joined to a lower portion of the shell, and a roof supported by the vertical shell;

a partition fixed in place inside of the shell dividing it into an upper receptacle suitable for storage of liquid and a lower fluid receptacle, said partition barring fluid flow to and from the lower and upper receptacles and providing vertical support for liquid stored in the upper receptacle;

said lower receptacle being filled with fluid maintained therein under sufficient pressure to thereby provide support for the upper receptacle; and sensing and monitoring means associated with the upper receptacle to sense the deflection of said partition and including means to raise the fluid pressure inside the lower receptacle in response to loading on the partition.

2. The tank of claim 1 in which the fluid in the lower receptacle is essentially only liquid.

3. The tank of claim 2 in which:

said upper receptable includes an inner liquid storage container positioned therein with side means spaced inwardly from the vertical shell and a container bottom spaced above the partition; and, thermal insulating means surrounding said storage container.

4. The tank of claim 3 in which:

said upper receptacle is adapted to receive and store a cryogenic liquefied gas and the pressureinducing liquid in the lower receptacle is water.

5. The tank of claim 1 in which:

fluid filling means are in communication with the lower receptacle and include positive pressure means to apply fluid pressure to the lower receptacle to balance the static pressure provided when liquid is in the upper receptacle.

6. The tank of claim 5 in which:

the fluid in the lower receptacle is a liquid, and said positive pressure means includes a standpipe for maintaining a pressurizing liquid level above the level of liquid in the lower receptacle.

7. The tank of claim 1 in which:

said sensing and monitoring means includes a deflection-sensing means in direct contact with the partition.

8. The tank of claim 1 in which:

said sensing and monitoring means includes liquid level gauging means mounted to detect the level of liquid in the upper receptacle.

9. An offshore tank resting on a sea floor for storage of a liquid comprising:

a vertical shell, a bottom resting on a sea floor and joined to a lower portion of the shell, and a roof supported by the vertical shell;

a partition fixed in place inside of the shell dividing it into an upper receptacle suitable for storage of liquid and a lower fluid receptacle, said partition barring fluid flow to and from the lower and upper receptacles and providing vertical support for liquid stored in the upper receptacle;

said lower receptacle containing fluid maintained therein under sufficient pressure to thereby provide support for the upper receptacle;

fluid filling means in communication with the lower receptacle and including positive pressure means to apply fluid pressure to the lower receptacle to balance static pressure against the partition when liquid is in the upper receptacle; and sensing and monitoring means associated with the upper receptacle to sense the deflection of said partition, and including means with said positive pressure means to raise the fluid pressure inside the lower receptacle in response to liquid loading on the partition.

10. The tank of claim 9 in which:

the fluid in the lower receptacle is only a liquid, and said positive pressure means includes a standpipe for maintaining a pressurizing liquid level therein above the level of liquid in the lower receptacle.

11. A method for the storage of a liquid offshore comprising the steps of:

providing a storage tank and dividing the tank into at least an upper receptacle and a lower receptacle by a common partition wall;

filling the lower receptacle with a fluid in supportive contact with the partition wall;

feeding liquid to be stored into the upper receptacle and supporting said liquid with the bottom partition wall; and monitoring the loading on the partition and pressurizing the fluid in the lower tank section to regulate support applied to the bottom of the partition.

12. The method of claim 11 in which:

said monitoring includes the steps of directly sensing deflection of the partition and filling fluid into said lower receptacle for providing pressurized support to the partition.

13. The method of claim 11 in which:

said monitoring includes the steps of sensing the liquid level in the upper receptacle and calibrating the sensing of liquid level therein to a corresponding deflection and loading on the partition; and in response to the monitoring pressurizing fluid in the lower receptacle to provide support for the partition.

* * * * *

UNITED STATES PATENT AND TRADEMARK OFFICE
CERTIFICATE OF CORRECTION

PATENT NO. : 3,898,846
DATED : August 12, 1975
INVENTOR(S) : John Stanton McCabe It is certified that error appears in the above-identified patent and that said Letters Patent are hereby corrected as shown below:

Column 2, line 15, change "theses" to --these--; column 4, line 7, change "banks" to --bands--; line 63, change "regulation" to --regulating--; column 6, line 25, change "by" to --By--; line 42, change "no" to --so--; line 43, change "mae" to --make--.

Signed and Sealed this eleventh Day of November 1975

[SEAL]

Attest:

RUTH C. MASON
Attesting Officer

C. MARSHALL DANN
Commissioner of Patents and Trademarks